Dec. 6, 1966    G. W. YOUNG    3,289,394
FILTER SUPPORT ARRANGEMENT
Filed Nov. 12, 1964
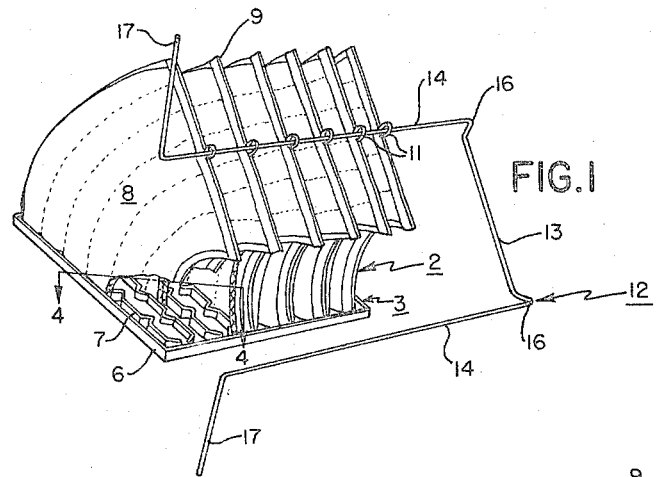
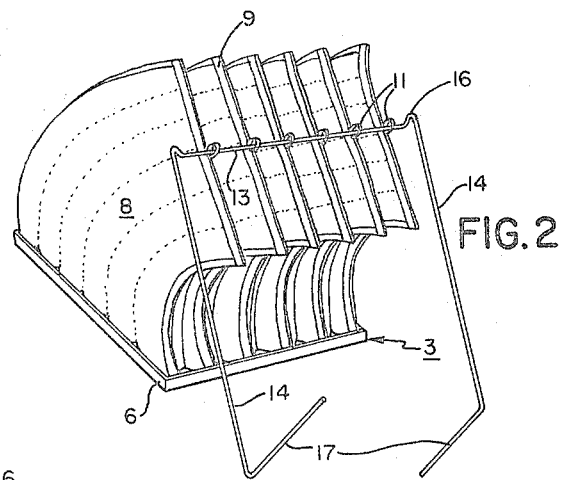
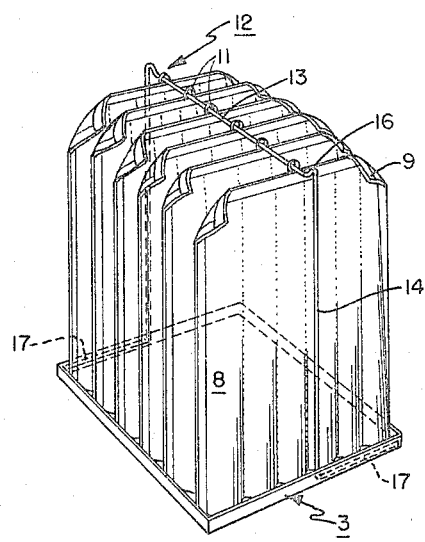
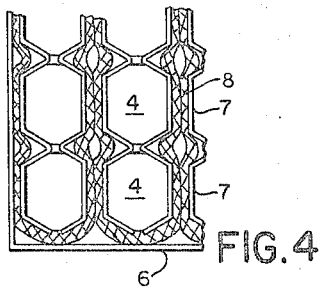
INVENTOR.
GEORGE W. YOUNG
BY
Ralph B. Crick
ATTORNEY ized Dec. 6, 1966

United States Patent Office 3,289,394

3,289,394
FILTER SUPPORT ARRANGEMENT
George W. Young, Fern Creek, Ky., assignor to American Air Filter Company, Inc., Louisville, Ky., a corporation of Delaware
Filed Nov. 12, 1964, Ser. No. 410,532
1 Claim. (Cl. 55—341)

This invention relates to fluid filters and more particularly to an improved filter arrangement wherein high efficiency pocket-type fluid filters are readily and efficiently supported in a vertical position in a fluid stream to be treated. This invention comprises a modification to the inventive arrangement set forth in assignee's application Serial No. 410,565, filed under the name of Allan R. Getzin on November 12, 1964.

In accordance with the present invention, an improved fluid filter arrangement is provided which permits pocket-type filters to be supported in a fluid stream to be treated in a vertical position in an economical and straightforward manner with a minimum of assembly steps. In addition it is possible to effectively and firmly support pocket-type fluid filters in a vertical position with a minimum of support structure.

Various other features of the present invention will become obvious to one skilled in the art upon reading the disclosure set forth herein.

More particularly, the present invention provides a dust filter apparatus comprising: a boxlike set of vertically-extending spaced and parallel filter pockets having upstream open-ended mouth portions; a set of loop supports fastened to the filter pockets along the downstream edges thereof opposite the open-ended mouth portions at points intermediate the downstream corners thereof; a horizontally-extending apertured header fastened to and communicating with the upstream open-ended mouth portions of the filter pockets; a U-shaped rod member having its base portion passing through the loop supports, and its legs extending in longitudinal vertical fashion along the outer sides of the boxlike set of pockets to the header; and rod support means for the U-shaped rod member adapted to engage with the header to hold the rod member in vertically erect position.

It is to be understood that various changes can be made in the arrangement, form and construction of the apparatus disclosed herein without departing from the scope or spirit of the present invention.

Referring to the drawing:

FIGURE 1 is a perspective view of one embodiment of the inventive dust filter apparatus in partially assembled condition;

FIGURE 2 is another perspective view of the apparatus of FIGURE 1 in further partially assembled condition;

FIGURE 3 is still another perspective view of the apparatus of FIGURE 1 in fully assembled condition; and FIGURE 4 is an enlarged, cross-sectional view of a portion of the apparatus of FIGURE 1 taken in a plane passing through line 4—4 of FIGURE 1.

As can be seen in FIGURE 1, a pocket-type unit filter arrangement 2 is disclosed in which the novel features of the present invention can be readily incorporated. The pocket-type unit filter 2 can be similar to the arrangement set forth in assignee's Patent No. 3,124,441, issued to R. D. Rivers on March 10, 1964. As such, it includes an integral frame or header member 3 which can be of metal or some other suitably rigid material. Header 3 is provided with a series of fluid passageways or apertures 4 and includes outer dependent peripheral border walls 6 forming pairs of oppositely disposed recess corners with the main body of the header and dependent aperture walls 7 which serve to continuously surround apertures 4 and about which the mouths of the set of spaced parallel filter pockets 8 communicably fasten to be displaced in open operating position. Each pocket member 8 includes a pair of substantially identical rectangularly-shaped pocket halves of relatively nonstretchable, porous, pliable, clothlike filtering material. Advantageously, a suitable fabric of fibrous glass-type material having fibers of substantially one micron in size can be used which, if desired, can be of variable density as known in the art. Each pocket 8 is provided with a peripheral strip of binding tape or piping 9 which can be of cloth-like fabric and which is arranged to include a loop support 11. Advantageously, loop support 11 can be integral with and part of tape 9. It is to be understood that loop support 11 also can be a separately fastened loop of cliplike nature if so desired. As can be seen in FIGURE 3, when apertured header 3 is oriented in the horizontal position with the set of filter pockets 8 extending vertically thereabove in boxlike fashion, loop supports 11 are aligned along the upper downstream edges of the boxlike set of pockets 8 opposite the mouth portions, the loop supports being positioned intermediate the downstream corners of the downstream edges of the pockets 8. Advantageously, loop supports 11 are positioned midway along such downstream edges of the pockets.

To support pockets 8 in a vertical position above header 3, U-shaped rod member 12 is utilized. Rod member 12 includes a base portion 13 and a pair of opposed spaced legs 14, the base portion being offset from the legs by offset elements 16. The extremity of each leg 14 is further provided with a support means for the U-shaped rod member in the form of a support leg 17 which extends in right-angle fashion from the leg, one support member 17 of one leg 14 extending in an opposite direction from the support member of the other leg. In assembly, these support members are arranged to nest in one of the two pairs of oppositely disposed recess corners formed by border member 6. It is to be noted that legs 17 are so sized that the sum of the length of both such legs is substantially equal to the length of one of the opposite pair of recess corners 6 with which the legs engage. Thus, when pockets 8 are held in vertical position by U-shaped member 12 with legs 17 in nesting engagement with the recess corners formed by one pair of opposite sides of border member 6, the ends of legs 17 abut against the other pair of opposite sides of border member 6 and it is not possible for rod member 12 to move in one direction or the other. In this manner, a firm and fast support of the rod member 12 in header 3 is arrived at with a minimum of materials.

The invention claimed is:

Dust filter apparatus comprising: a boxlike set of vertically extending spaced and parallel filter pockets having upstream open-ended mouth portions; a substantially rectangular horizontally extending apertured header fastened to and communicating with said upstream open-ended mouth portions of said filter pockets, said header having a rectangular border member extending along the perimeter thereof to provide first and second pairs of oppositely disposed recess corners along the perimeter thereof; a single U-shaped rod member comprising the sole support for said set of filter pockets having its base portion extending transverse to the downstream edges of said pockets to be adjacent points substantially half way between downstream corners of said filter pockets, said rod member having its legs extending in longitudinal vertical fashion along the outer sides of said boxlike set of pockets to said header; means to fasten said base portion of said rod member to said filter pockets along said points half way between the downstream corners of said pockets; a pair of support legs extending in horizontal right-angle fashion from the extremities of said vertically extending legs of said rod member in opposite directions from each other, said support legs being positioned to engage in nesting relationship with one of the two pairs of opposite recess corners formed by the border member on said header, the sum of the lengths of said support legs being substantially equal to the length of one of the recess corners with which the legs engage so that the ends of the support legs abut against the sides of the border member forming the other pair of opposite recess corners to hold said support rod member in fast position.

References Cited by the Examiner

UNITED STATES PATENTS

| | | | |
|---|---|---|---|
| 2,504,821 | 4/1950 | Fowler | 211—86 X |
| 2,607,436 | 8/1952 | Martin | 55—381 X |
| 2,774,443 | 12/1956 | Slayter | 55—379 |
| 3,120,432 | 2/1964 | Aldrich | 55—378 X |
| 3,124,441 | 3/1964 | Rivers | 55—500 |

ROBERT F. BURNETT, *Primary Examiner.*